United States Patent
Ohtomo et al.

(10) Patent No.: US 8,937,278 B2
(45) Date of Patent: Jan. 20, 2015

(54) ROTATION ANGLE DETECTING APPARATUS

(71) Applicant: Kabushiki Kaisha TOPCON, Itabashi-ku, Tokyo-to (JP)

(72) Inventors: Fumio Ohtomo, Asaka (JP); Kaoru Kumagai, Tokyo-to (JP); Tetsuji Anai, Tokyo-to (JP); Kazuki Osaragi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 84 days.

(21) Appl. No.: 13/868,521

(22) Filed: Apr. 23, 2013

(65) Prior Publication Data

US 2013/0284909 A1     Oct. 31, 2013

(30) Foreign Application Priority Data

Apr. 26, 2012    (JP) ................. 2012-101786

(51) Int. Cl.
     *G01D 5/34*      (2006.01)
     *G01D 5/347*     (2006.01)

(52) U.S. Cl.
    CPC .......... *G01D 5/3473* (2013.01); *G01D 5/34792* (2013.01)
    USPC .................................................. 250/231.14

(58) Field of Classification Search
    USPC ................... 250/231.13–231.18, 236, 559.3; 356/139.1
    See application file for complete search history.

(56) References Cited

U.S. PATENT DOCUMENTS

| | | | |
|---|---|---|---|
| 6,741,343 B2 * | 5/2004 | Shafer et al. .............. | 356/247 |
| 8,314,941 B2 * | 11/2012 | Walther .................... | 356/622 |
| 8,321,167 B2 | 11/2012 | Haijima et al. | |

FOREIGN PATENT DOCUMENTS

| | | |
|---|---|---|
| JP | 2003-5004 A | 1/2003 |
| JP | 2009-156773 A | 7/2009 |

* cited by examiner

*Primary Examiner* — Seung C Sohn
(74) *Attorney, Agent, or Firm* — Nields, Lemack & Frame, LLC

(57) ABSTRACT

A rotation angle detecting apparatus comprises a shaft portion space formed in a rotation shaft, a bearing holder space, a first condenser lens, a second condenser lens to face the first condenser lens, a detection pattern provided at a focal position of one of the first condenser lens and the second condenser lens, an image sensor provided at a focal position of the other of the first condenser lens and the second condenser lens, and an arithmetic unit for calculating an angle displacement of the rotation shaft. The arithmetic unit carries out a total circumferential scanning, extracts a frequency component, carries out a scanning of a reference designation pattern, and calculates the angle displacement of the rotation shaft based on a phase difference of the frequency component and the number of frequencies corresponding to a change in a position of the reference designation pattern.

8 Claims, 6 Drawing Sheets

FIG.6
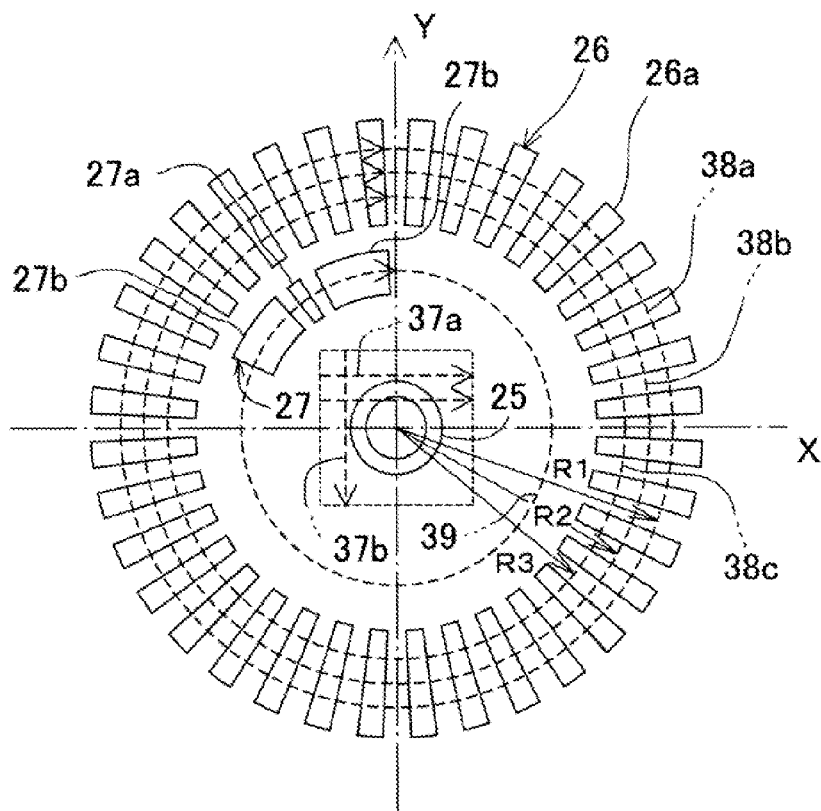
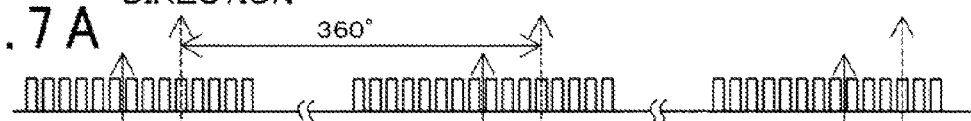
FIG.7A
FIG.7B
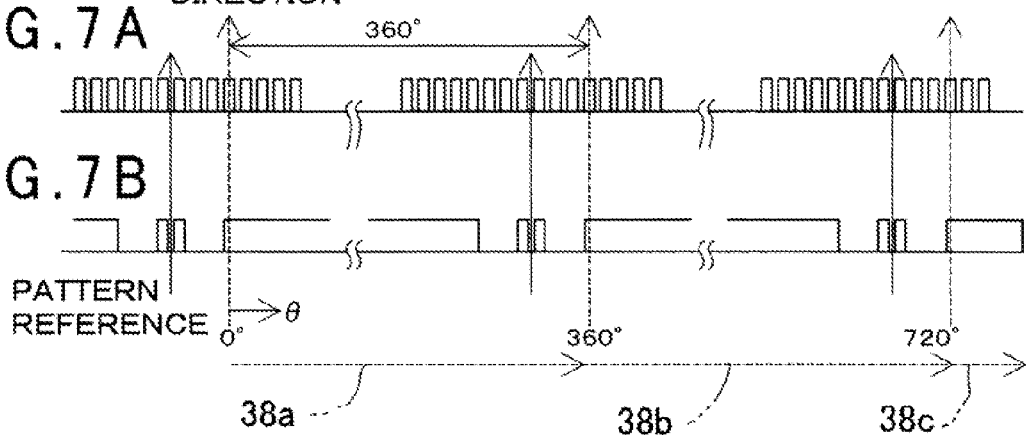

ROTATION ANGLE DETECTING APPARATUS

BACKGROUND OF THE INVENTION

The present invention relates to a rotation angle detecting apparatus that highly accurately detects a rotation angle.

In the industrial machines, the surveying instruments, and others, a rotation angle detecting apparatus that detects a rotation angle is provided in a rotation unit. Nowadays, a highly accurate and small rotation angle detecting apparatus is demanded for these machines or instruments.

In general, as a rotation angle detecting apparatus used in a surveying equipment, an encoder is adopted, and a highly accurate encoder is expensive. Further, in order to improve a rotation accuracy of a rotation shaft to a required accuracy, just managing a machining accuracy for each individual component is difficult, the fine adjustment and the precision finishing in an assembled state of the rotation shaft and a bearing holder are required, which results in a very high price.

SUMMARY OF THE INVENTION

It is an object of the present invention to provide a rotation angle detecting apparatus that is small in size and has a simple configuration.

To attain the above object, a rotation angle detecting apparatus according to the present invention comprises a shaft portion space formed in a rotation shaft, a bearing holder space formed in a bearing holder, a first condenser lens accommodated in the shaft portion space, a second condenser lens provided in the bearing holder space and provided to face the first condenser lens, a detection pattern provided at a focal position of one of the first condenser lens and the second condenser lens, an image sensor provided at a focal position of the other of the first condenser lens and the second condenser lens, and an arithmetic unit which calculates an angle displacement of the rotation shaft based on a signal from the image sensor, wherein the detection pattern has an angle detection pattern in which the bar-like line segments extending in a radial direction are arranged at a predetermined angle pitch and a ring-like track is formed, and a reference designation pattern indicates a reference position of the angle detection pattern, and the arithmetic unit carries out a total circumferential scanning on the track with a predetermined radius with a center of the angle detection pattern as the center in regard to a projection image of the detection pattern obtained by the image sensor, extracts a frequency component, scans the reference designation pattern, and calculates the angle displacement of the rotation shaft based on a phase difference of the frequency component and the number of frequencies corresponding to a change in position of the reference designation pattern.

Further, in the rotation angle detecting apparatus according to the present invention, the line segments of the angle detection pattern are obtained by dividing the track by 2n radii at an equal angle pitch and have a wedge-like shape.

Furthermore, in the rotation angle detecting apparatus according to the present invention, the detection pattern has a circular pattern that is concentric with the angle detection pattern, and the arithmetic unit scans a projection image of said circular pattern in two directions orthogonal to each other and obtains the center of the angle detection pattern.

Moreover, in the rotation angle detecting apparatus according to the present invention, the track is equally divided into an even number, an average of the phases of the frequency components of the respective line segments in each divided portion is obtained, and the center of the angle detection pattern is detected from a phase difference between the divided portions that face each other.

Additionally, in the rotation angle detecting apparatus according to the present invention, the total circumferential scanning is carried out more than once with different radii.

According to the present invention, the rotation angle detecting apparatus comprises a shaft portion space formed in a rotation shaft, a bearing holder space formed in a bearing holder, a first condenser lens accommodated in the shaft portion space, a second condenser lens provided in the bearing holder space and provided to face the first condenser lens, a detection pattern provided at a focal position of one of the first condenser lens and the second condenser lens, an image sensor provided at a focal position of the other of the first condenser lens and the second condenser lens, and an arithmetic unit for calculating an angle displacement of the rotation shaft based on a signal from the image sensor, wherein the detection pattern has an angle detection pattern in which bar-like line segments extending in a radial direction are arranged at a predetermined angle pitch and a ring-like track is formed by bar-like line segments, and a reference designation pattern for indicating a reference position of the angle detection pattern, and the arithmetic unit carries out a total circumferential scanning on the track with a predetermined radius with a center of the angle detection pattern as the center in regard to a projection image of the detection pattern obtained by the image sensor, extracts a frequency component, carries out a scanning of the reference designation pattern, and calculates the angle displacement of the rotation shaft based on a phase difference of the frequency component and the number of frequencies corresponding to a change in position of the reference designation pattern. Therefore, the distortion of the pattern, a shape error of the line segments, the illumination unevenness, a difference in sensitivity between the pixels, and a quantization error are canceled out and averaged, and hence a small and highly accurate configuration can be obtained.

Further, according to the present invention, since the line segments of the angle detection pattern are obtained by dividing the track by 2n radii at an equal angle pitch and have a wedge-like shape, the equal signals can be acquired as the signals obtained by scanning the whole circumference irrespective of a difference in radius.

Further, according to the present invention, since the detection pattern has a circular pattern that is concentric with the angle detection pattern, and the arithmetic unit scans a projection image of the circular pattern in two directions orthogonal to each other and obtains the center of the angle detection pattern, the center position can be easily detected by the signal processing without physically measuring the center, and hence the center can be measured at an arbitrary time point, e.g., during the measurement.

Further, according to the present invention, the track is equally divided into an even number, an average of the phases of the frequency components of the respective line segments in each divided portion is obtained, and the center of the angle detection pattern is detected from a phase difference between the divided portions that face each other. Therefore, the distortion of the pattern, a shape error of the line segments, and others are averaged, and the center position can be highly accurately detected.

Furthermore, according to the present invention, since the total circumferential scanning is carries out more than once with different radii, influences of the distortion of the pattern, a shape error of the line segments, and the illumination unevenness are further averaged, the different pixels are used, a quantization error such as a difference in sensitivity between the pixels can be averaged and accuracy is improved.

BRIEF DESCRIPTION OF THE DRAWINGS

FIG. 6 is an explanatory view showing a state of the scan when the angle detection using the detection pattern is performed;

FIG. 7A and FIG. 7B are the waveform charts of the signals obtained by the detection pattern, where FIG. 7A shows the signals from an angle detection pattern and FIG. 7B shows the signals from a reference designation pattern.

DETAILED DESCRIPTION OF THE PREFERRED EMBODIMENTS

An embodiment according to the present invention will now be described hereinafter with reference to the accompanying drawings.

First, referring to FIG. 1, a rotation angle detecting apparatus according to an embodiment of the present invention will be explained.

Figure 1:
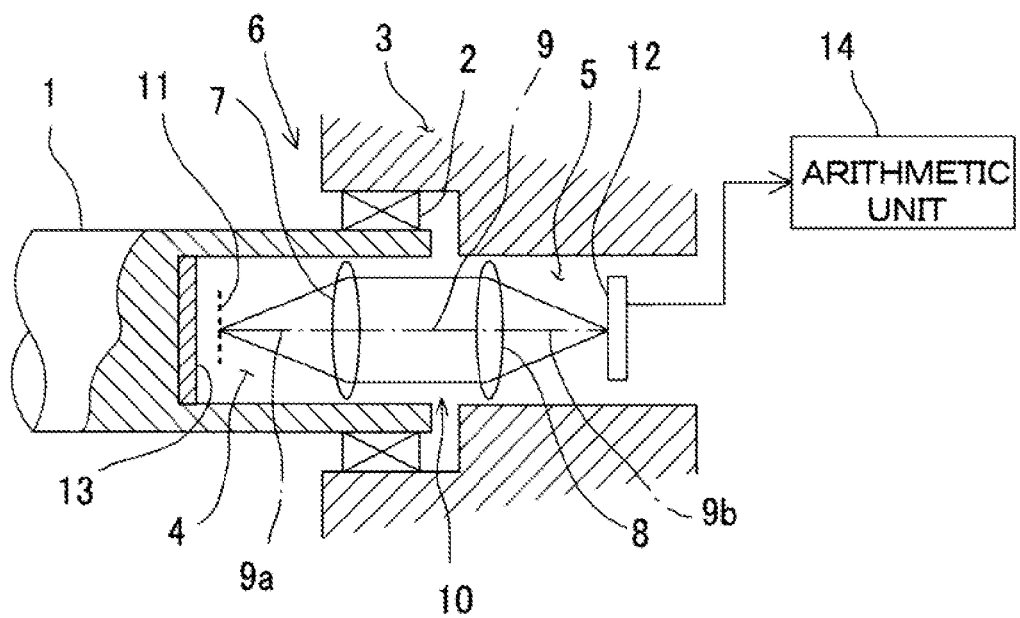
FIG. 1 is a schematic block diagram of a rotation angle detecting apparatus according to an embodiment of the present invention.

In FIG. 1, a reference numeral 1 denotes a rotation shaft which is a rotation angle measurement target, and the rotation shaft 1 is rotatably supported by a bearing holder 3 through a bearing 2.

At an end portion of the rotation shaft 1, a cylindrical shaft portion space 4 is formed so as to be concentric with a shaft center of the rotation shaft 1, and a shaft end portion has a hollow configuration. A bearing holder space 5 is formed in the bearing holder 3 on an extended line of the shaft center of the shaft portion space 4. The bearing holder space 5 is a space that is concentric with the shaft portion space 4 and continuous with the shaft portion space 4. In the shaft portion space 4 and the bearing holder space 5, the primary constituent elements of a rotation angle detecting apparatus 6 are accommodated.

A first condenser lens 7 is provided in the shaft portion space 4, and a second condenser lens 8 is provided in the bearing holder space 5. A magnifying power of each of the first condenser lens 7 and the second condenser lens 8 is a magnifying power of 1, and these lenses have the same focal length.

The first condenser lens 7 and the second condenser lens 8 have optical axes 9a and 9b, respectively, the optical axis 9a substantially coincides with a shaft center of the rotation shaft 1, and the optical axis 9b substantially coincides with a shaft center of the bearing holder space 5.

On a bottom portion of the shaft portion space 4, a detection pattern 11 is provided, and the detection pattern 11 is placed at a focal position of the first condenser lens 7. Further, an image sensor 12 is provided in the bearing holder space 5, and the image sensor 12 is placed at a focal position of the second condenser lens 8. It is preferable for the image sensor 12 to be held so that the thermal strain does not occur even though a temperature increases.

A light emitting unit to illuminate the detection pattern 11 is provided at appropriate position in the bearing holder space 5 or in the shaft portion space 4. The drawing shows a light emitting unit 13 that is provided on a bottom portion of the shaft portion space 4 and illuminates the detection pattern 11 as an example.

A basic shape of the detection pattern 11 is a circular shape, and a diameter of the pattern is approximately 5 mm to 10 mm. Furthermore, it is preferable for a material of a member forming the detection pattern 11 to be equal or equivalent to a material of the rotation shaft 1 and a material of the bearing holder 3, or have the same or equivalent thermal expansion coefficient as thermal expansion coefficient of the material of the bearing holder 3.

As the image sensor 12, a CCD or a CMOS sensor or the like which is an aggregate of the pixels is used. The optical axis 9b is set so as to run through an origin of a coordinate system assumed for the image sensor 12, and a position (a coordinate position) of each pixel can be specified on the image sensor 12.

A photodetection signal from the image sensor 12 is input to an arithmetic unit 14, and the arithmetic unit 14 is configured to measure a rotation angle of the rotation shaft 1 and a runout caused due to an inclination (an inclination angle) of the rotation shaft 1 based on the photodetection signal.

The detection pattern 11, the first condenser lens 7, the second condenser lens 8, the image sensor 12, and others accommodated in the shaft portion space 4 and the bearing holder space 5 constitute a primary portion of the rotation angle detecting apparatus 6. Further, the first condenser lens 7 and the second condenser lens 8 constitute a rotation angle detection optical system 10 for forming a projection image of the detection pattern 11 on the image sensor 12.

It is to be noted that the detection pattern 11 may be provided in the bearing holder space 5, and the image sensor 12 may be provided in the shaft portion space 4.

Figure 2:
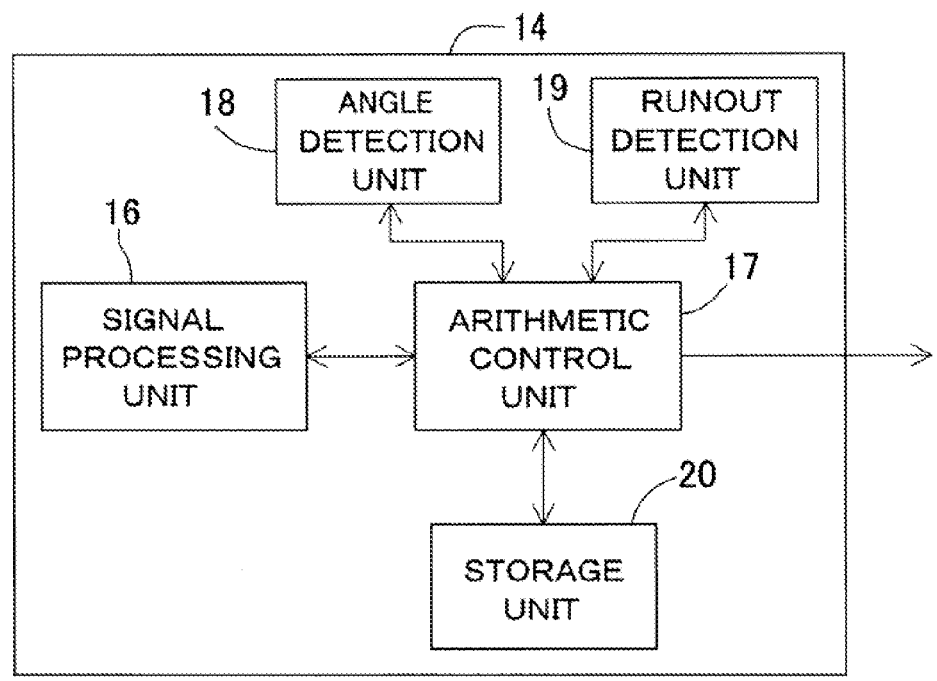
FIG. 2 is a schematic block diagram of an arithmetic unit according to the present embodiment.

As shown in FIG. 2, the arithmetic unit 14 is mainly configured with a signal processing unit 16, an arithmetic control unit 17, an angle detection unit 18, a runout detection unit 19, a storage unit 20, and others.

The signal processing unit 16 executes the signal processing, e.g., amplification or A/D conversion with respect to data output from the image sensor 12 so that the data can be stored.

In the storage unit 20, various programs are stored. The programs include a control program for controlling the acquisition of a signal from the image sensor 12, a rotation angle arithmetic program for detecting a rotation angle of the rotation shaft 1, a runout arithmetic program for detecting a runout of the rotation shaft 1, a signal processing program for executing signal processing, e.g., extracting a signal required to detect a rotation angle or detect a runout, and others. Furthermore, in the storage unit 20, the image data output from the image sensor 12, the data obtained by calculation (which will be described later), and others are stored.

The arithmetic control unit 17 performs calculating and controlling based on the program, carries out a synchronization control for the acquisition of a signal from the image sensor 12, and executes the program.

The angle detection unit 18 calculates a rotation angle of the rotation shaft 1 based on a signal from the image sensor 12, and the angle detection unit 18 is mainly configured with the rotation angle arithmetic program and the arithmetic control unit 17. Moreover, the runout detection unit 19 calculates a runout of the rotation shaft 1 based on a signal from the image sensor 12, and the runout detection unit 19 is mainly configured with the runout arithmetic program and the arithmetic control unit 17.

Figure 3:
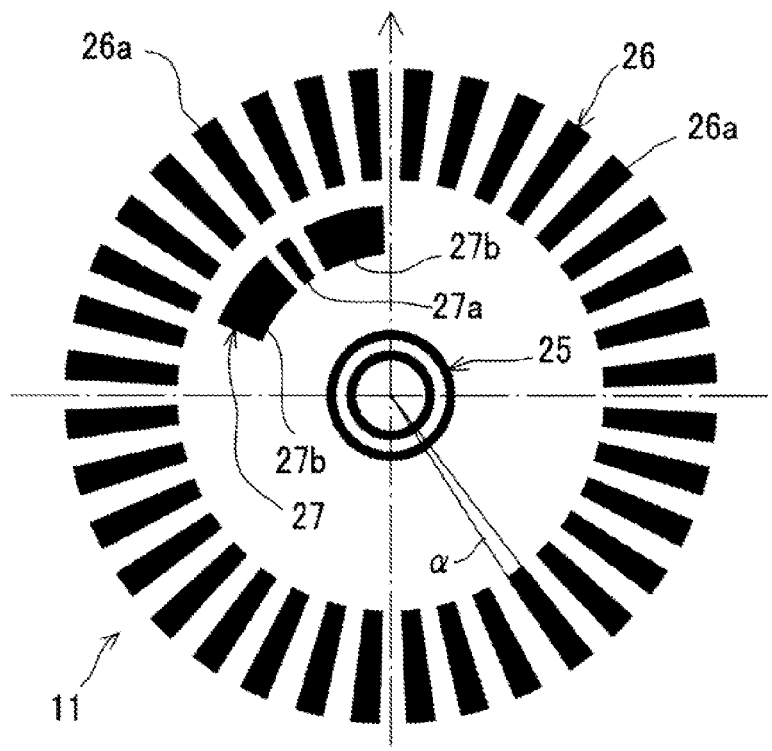
FIG. 3 is a view showing an example of a detection pattern used in the present embodiment.

An example of the detection pattern 11 used in the present embodiment will now be described with reference to FIG. 3.

A basic shape of the detection pattern 11 is a circle, and the center of the detection pattern 11 is configured to substantially coincide with an optical axis of the first condenser lens 7, i.e., the optical axis 9a.

The detection pattern 11 is constituted of a circular pattern 25 which is a centering pattern provided at the center, and an angle detection pattern 26 and a reference designation pattern 27 which are arranged as patterns for angle detection around the circular pattern 25 concentrically with the circular pattern 25. The circular pattern 25 consists of a plurality of perfect circles (two concentric multi circles in the drawing) drawn with a predetermined line width. It is to be noted that, as the centering pattern, a pattern that enables determining the center can suffice, and for example, a cross line can be used.

The angle detection pattern 26 has a configuration that n line segments 26a (which are darkened portions in the drawing) with a predetermined length extending in a radial direction are arranged on the entire circumference at an equal angle pitch, and the line segments 26a form a ring-like track. In other words, the angle detection pattern 26 is formed by the fact that a ring having a predetermined track width (a predetermined length in the radial direction) is equally divided into 2n on the entire circumference by 2n radii, and the line segments 26a are formed every other row. Therefore, each of the line segments 26a has a wedge-like shape and also has a center angle α of 360°/2n. Additionally, the center of the angle detection pattern 26 is the same as the center of the circular pattern 25.

The reference designation pattern 27 is formed on the inner side of the angle detection pattern 26 and concentric with the angle detection pattern 26. The reference designation pattern 27 has an arc shape having a predetermined width in the radial direction. Further, the reference designation pattern 27 is divided into a plurality of patterns in the circumferential direction and formed of one position designation pattern 27a and a pair of direction designation patterns 27b arranged on both the sides of the position designation pattern 27a.

The position designation pattern 27a has the same center angle as the line segments 26a, and the position designation pattern 27a is placed on the same radial line as one of the line segments 26a.

Each of the direction designation patterns 27b has a symmetrical position and a symmetrical shape with respect to the position designation pattern 27a, and also has a circumferential length (a center angle 5a) across the three line segments 26a. It is to be noted that a width (a circumferential length) of each of the direction designation patterns 27b is not restricted to the width corresponding to the three line segments 26a, but a width different from the width of the line segment 26a can suffice.

If the detection pattern 11 is a reflection type, the line segments 26a, the position designation pattern 27a, and the direction designation patterns 27b may be designed to not reflect the light and any other portion may be designed to be reflective, or the line segments 26a, the position designation pattern 27a, and the direction designation patterns 27b may be designed to be reflective and any other portion may be designed to be non-reflective.

Alternatively, if the detection pattern 11 is of a transmissive type, the line segments 26a, the position designation pattern 27a, and the direction designation patterns 27b may be designed to transmit the light therethrough and any other portion may be designed to be non-transmissive, or the line segments 26a, the position designation pattern 27a, and the direction designation patterns 27b may be designed to be non-transmissive and any other portion may be designed to be transmissive.

In the following description, the detection pattern 11 is of the transmissive type and the line segments 26a, the position designation pattern 27a, and the direction designation patterns 27b are of the non-transmissive type.

An operation of the rotation angle detecting apparatus 6 will now be described.

The rotation angle detecting apparatus 6 can detect a rotation angle and a runout (a slant of the rotation shaft) caused by the rotation.

An image of the detection pattern 11 is projected onto the image sensor 12 in the one-on-one relationship by the operation of the first condenser lens 7 and the second condenser lens 8, and the image sensor 12 produces a signal corresponding to the image of the detection pattern 11 as received.

When the rotation shaft 1 rotates, the detection pattern 11 rotates integrally with the rotation shaft 1, and the detection pattern image as rotated is projected onto the image sensor 12. Since the image sensor 12 produces a photodetection signal in accordance with each pixel, for example, when the angle detection pattern 26 and the reference designation pattern 27 move, a position of each pixel that photodetects the images of the angle detection pattern 26 and the reference designation pattern 27 varies. Therefore, detecting a change in position of each pixel that photodetects the images of the angle detection pattern 26 and the reference designation pattern 27 based on the signal from the image sensor 12 enables detecting a rotation angle of the rotation shaft 1 with respect to the bearing holder 3.

Moreover, when the rotation angle is differentiated with a time difference between the angles before and after the angle varies, a rotating speed can be detected. Additionally, when a change in center position of the angle detection pattern 26 is detected, a runout can be detected with this time difference.

Figure 4:
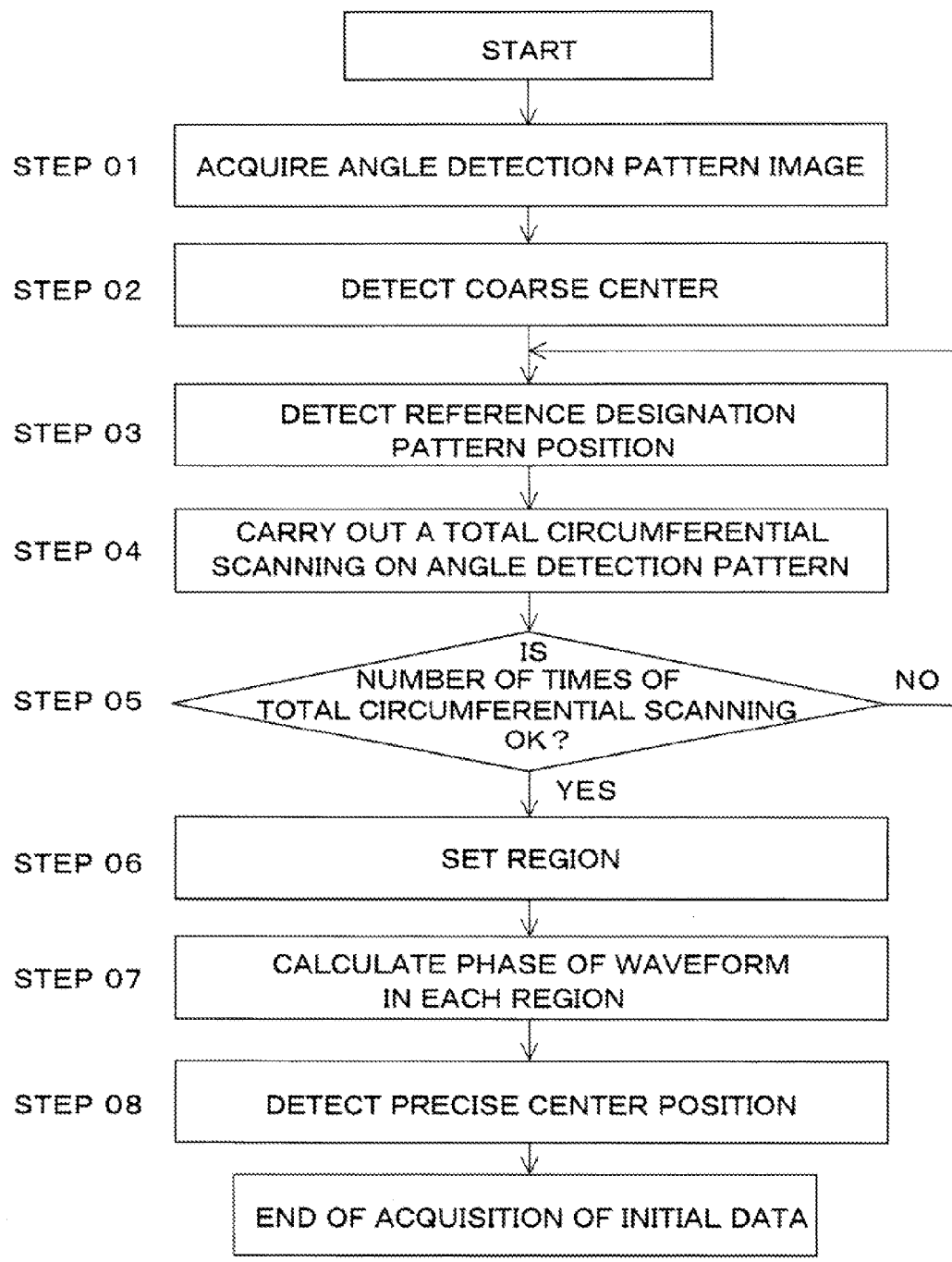
FIG. 4 is a flowchart of the angle detection and the center detection according to the present embodiment.
Figure 5:
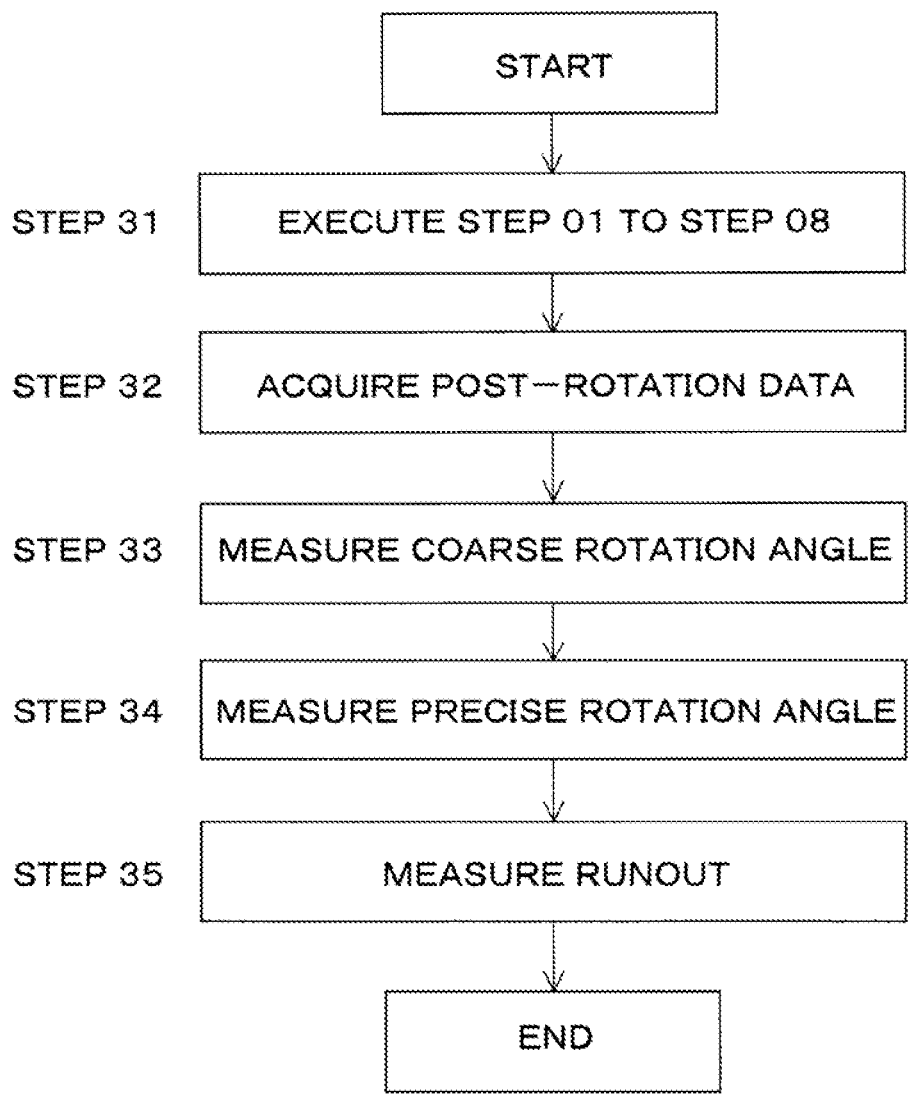
FIG. 5 is a flowchart of the rotation angle detection according to the present embodiment.

With reference to FIG. 4 to FIG. 6, the detection of a rotation angle and the detection of a runout will now be described.

First, the initial data is acquired at STEP 01 to STEP 08.

STEP 01 A signal from the image sensor 12 is acquired before the measurement starts (i.e., an initial state), an image data of the detection pattern 11 (which will be referred to as a pattern image data hereinafter) is acquired through the signal processing executed by the signal processing unit 16, and the pattern image data is stored in the storage unit 20.

In regard to each of the stored pattern image data, a scan line is set on an image signal (on the data stored in the storage unit 20), the scan is carried out along the scan line, and the data required for the detection of an angle or the detection of a runout is obtained. Here, since the scan line is a virtual line set on the image data, an arbitrary number of the scan lines can be set at the arbitrary positions, and increasing the number of the scan lines enables improving a measurement accuracy.

FIG. 6 shows a relationship between the circular pattern 25, the angle detection pattern 26, the reference designation pattern 27, and the scan lines in the detection pattern image. In FIG. 6, X and Y represent an X axis and a Y axis set on the image sensor 12. An intersecting point of the X axis and the Y axis, i.e., an origin of an X-Y rectangular coordinate coincides with the optical axis 9b. Further, in FIG. 6, the darkening of the line segments 26a, the position designation pattern 27a and the direction designation patterns 27b is omitted.

STEP 02 A center position of the detection pattern 11 is coarsely detected. The coarse detection of the center position is carried out based on the circular pattern 25.

A predetermined range is set with the origin of the X-Y rectangular coordinate as a reference, and a necessary number (three in the drawing) of the scan lines 37a and 37b is set so as to be parallel to the X axis and the Y axis. The scan is carried out along the scan lines 37a and 37b, and a signal of each pixel placed on the respective scan lines 37a and 37b is acquired. Based on a signal of each pixel as acquired, the circular pattern 25 is detected.

By detecting the circular pattern 25, the center of the circle, i.e., the center position of the detection pattern 11 is obtained as a coordinate value in the X-Y rectangular coordinate.

The circular scan lines 38a, 38b, and 38c, and a scan line 39 are set with the obtained center position at the center.

The scan lines 38a, 38b, and 38c are the concentric circles, set on the angle detection pattern 26, and have radii meeting R1>R2>R3, and R1, R2, and R3 are known values, respectively. It is to be noted that the number of the scan line 38 is set to be three, but is appropriately decided in accordance with a required accuracy. Furthermore, the scan line 39 is set on the reference designation pattern 27.

STEP 03 The scan line 39 is scanned in regard to the reference designation pattern 27, and signals are acquired in relation to the scan line 39. The acquired signals are shown in FIG. 7B. When the scan line 39 is scanned, a position of the reference designation pattern 27, i.e., a position of the position designation pattern 27a is obtained. The position of the reference designation pattern 27 may be acquired as a polar coordinate, or may be converted into the X-Y rectangular coordinate and then acquired.

STEP 04, STEP 05 In regard to the angle detection pattern 26, the total circumferential scanning is carried out on the scan lines 38a, 38b, and 38c, and signals are obtained with respect to the respective scan lines 38a, 38b, and 38c.

The signals obtained by scanning the scan lines 38a, 38b, and 38c are shown in FIG. 7A. In regard to the scan, the scan line is changed every rotation (360°), and the scan line is changed from the scan line 38a to the scan line 38b and from the scan line 38b to the scan line 38c. By the fact that the total circumferential scanning is carried out on the respective scan lines 38a, 38b, and 38c and the obtained results are averaged, errors are cancelled out, and a highly accurate phase is measured.

STEP 06 Subsequently, a region with respect to the angle detection pattern 26 is set. It is to be noted that the region may be set simultaneously with setting the scan lines 38a, 38b, and 38c.

Figure 8:
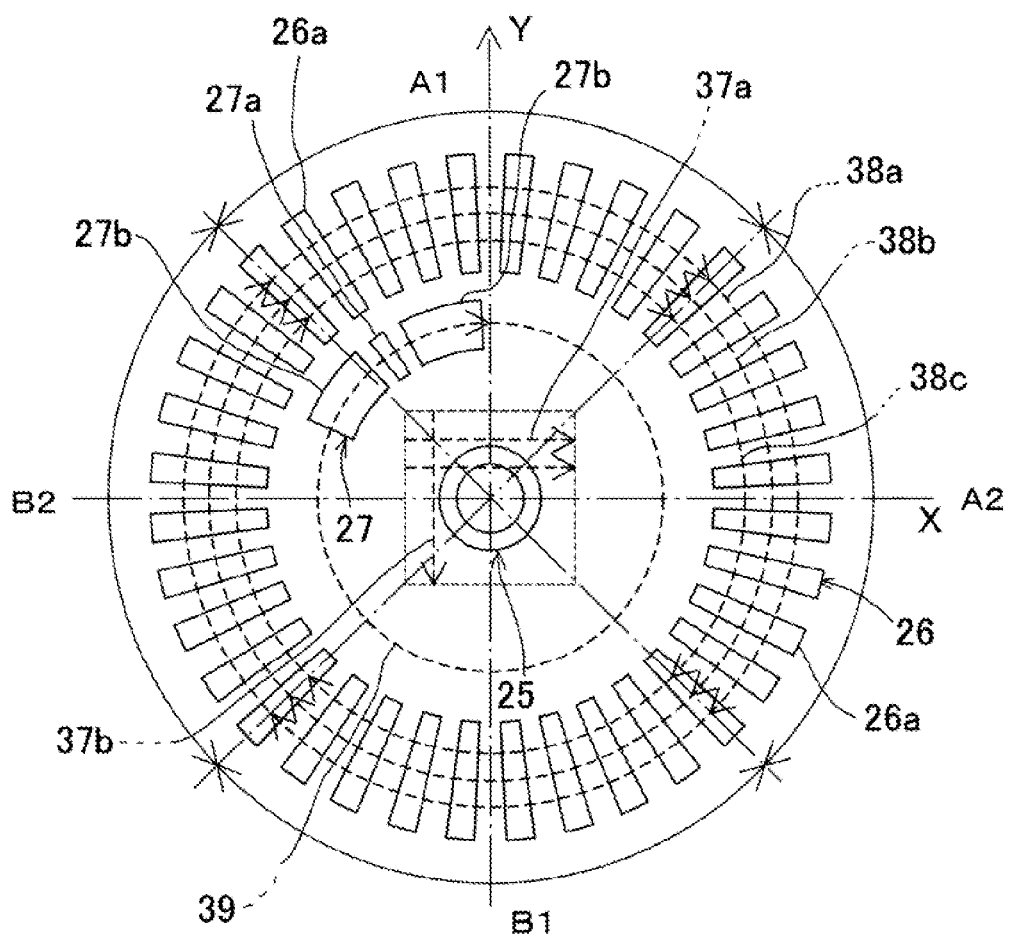
FIG. 8 is an explanatory view in case of obtaining a center position using the angle detection pattern.

FIG. 8 shows an example of the region setting.

With a center position obtained by the coarse detection in STEP 02 as a reference, the angle detection pattern 26 is equally divided into an even number (divided into four in the drawing) in the circumferential direction. The divided portions belonging to a range of 180° which is one of portions as divided by two are determined as A1 and A2, the divided portions belonging to another range of 180° as B1 and B2. Further, the divided portion A1 and the divided portion B1 are arranged to face each other, and the divided portion A2 and the divided portion B2 are arranged to face each other. Therefore, the phases of the divided portions corresponding to each other are 180° different from each other. Each of the above-described divided portions is determined as one region.

STEP 07 First, the total circumferential scanning is carried out along the scan line 38a, and in the obtained signals, signals of the line segments 26a belonging to each divided portion are acquired.

When the average waveform signals of frequencies of the divided portions obtained from all the scan lines 38a, 38b, and 38c are further averaged, a highly accurate waveform can be obtained.

STEP 08 In regard to the divided portions as described above, when the waveform and the phase as averaged are acquired, an averaged center position of the divided portion can be acquired with respect to each divided portion. Furthermore, when a polar coordinate of the center position of the divided portion is subjected to the coordinate transformation, a coordinate position of the center position of the divided portion in the X-Y rectangular coordinate can be obtained.

For example, referring to FIG. 8, the center position on the X-Y rectangular coordinate of each divided portion, i.e., each of the divided portion A1, the divided portion B1, the divided portion A2, and the divided portion B2 can be obtained respectively by calculation.

A straight line (Y center line) connecting the center of the divided portion A1 to the center of the divided portion B1 and a straight line (X center line) connecting the center of the divided portion A2 to the center of the divided portion B2 can be obtained. A center position of the X center line (a midpoint of the X center line) and a center position of the Y center line (a midpoint of the Y center line) become a center position of the detection pattern 11, respectively, and a coordinate position on the rectangular coordinate (a coordinate position on the X-Y rectangular coordinate system) is calculated.

The obtained highly accurate center position of the detection pattern 11 is stored in the storage unit 20 as an initial center coordinate.

It is to be noted that the X center line and the Y center line are represented by the following expressions.

$$X \text{ center line} = [\Phi(A1) - \Phi(B1)]/2$$

$$Y \text{ center line} = [\Phi(A2) - \Phi(B2)]/2$$

When the initial reference position, the initial waveform, the initial phase, and the initial center position in the initial state are acquired, a rotation angle of the rotation shaft 1 is measured.

The detection of the rotation angle will now be described with reference to FIG. 5.

STEP 31, STEP 32 In a state that the rotation shaft 1 is rotated a necessary angle, STEP 01 to STEP 08 are executed, and the data after the rotation, i.e., a reference position, a waveform, a phase, and a center position of the detection pattern 11 are obtained.

STEP 33 A coarse rotation angle is obtained from the initial reference position and a post-rotation reference position of the reference designation pattern 27. The coarse rotation angle can be obtained by multiplying a number N of the line segments 26a present between the initial reference position and the post-rotation reference position (i.e., a number of frequencies present between the initial reference position and the post-rotation reference position) by 360°/n.

STEP 34 A precise rotation angle is obtained based on the initial phase and the post-rotation phase. A phase difference σ is obtained from the initial phase and the post-rotation phase. When this phase difference σ is multiplied by 360°/n, an angle deviation in accordance with the phase difference can be obtained. Therefore, the precise rotation angle is as follows:

$$N \times 360°/n + \sigma \times 360°/n$$

STEP 35 By comparing the coordinate of the initial center position of the detection pattern 11 is compared with the coordinate of the post-rotation center position of the detection pattern 11, a deviation amount and a deviation direction can be calculated, and by correcting the measured rotation angle based on the deviation amount and the deviation direction as obtained, highly accurate angle measurement can be performed while taking the eccentricity of rotation and the runout into consideration. That is, even if the rotation shaft 1 has the runout, the highly accurate angle measurement can be executed.

If the center position in the initial state does not coincide with the optical axis 9b, i.e., the X-Y rectangular coordinate, previously acquiring the information of the runout when the rotation shaft 1 makes one revolution likewise enables performing the highly accurate angle measurement.

The rotation shaft 1 is rotated 360° at a predetermined angle pitch, and the center position (the center coordinate) of the detection pattern 11 at each angle pitch is obtained.

If the detection pattern 11 deviates from the optical axis 9a or the rotation shaft 1 has the runout with respect to the bearing holder 3, the center position of the detection pattern 11 does not coincide with the optical axis 9b, and a locus of the center position is a circle or an ellipse (which will be referred to as an eccentric circle hereinafter).

However, the obtained eccentric circle has the high reproducibility because of the mechanism and, if a rotating position (a rotation angle) of the rotation shaft 1 is known, a direction and an amount of the runout can be accurately grasped based on a locus of the deviation. Therefore, if the eccentric circle as the correcting information is acquired in advance, a measured angle is corrected, and the highly accurate angle measurement can be performed even in case of a rotation shaft having the runout. That is, highly accurate adjustment of a shaft of the rotation shaft 1 is not needed, and a production cost can be reduced.

As described above, since the eccentric circle has the high reproducibility, once the data of the eccentric circle is obtained, STEP 35 can be omitted.

The invention claimed is:

1. A rotation angle detecting apparatus, comprising a shaft portion space formed in a rotation shaft, a bearing holder space formed in a bearing holder, a first condenser lens accommodated in said shaft portion space, a second condenser lens provided in said bearing holder space and provided to face said first condenser lens, a detection pattern provided at a focal position of one of said first condenser lens and said second condenser lens, an image sensor provided at a focal position of the other of said first condenser lens and said second condenser lens, and an arithmetic unit for calculating an angle displacement of said rotation shaft based on a signal from said image sensor, wherein said detection pattern has an angle detection pattern in which bar-like line segments extending in a radial direction are arranged at a predetermined angle pitch and a ring-like track is formed by bar-like line segments, and a reference designation pattern for indicating a reference position of said angle detection pattern, and said arithmetic unit carries out a total circumferential scanning on said track with a predetermined radius with a center of said angle detection pattern as the center in regard to a projection image of said detection pattern obtained by said image sensor, extracts a frequency component, carries out a scanning of said reference designation pattern, and calculates said angle displacement of said rotation shaft based on a phase difference of said frequency component and the number of frequencies corresponding to a change in position of said reference designation pattern.

2. The rotation angle detecting apparatus according to claim 1, wherein said line segments of said angle detection pattern are obtained by dividing said track by 2n radii at an equal angle pitch and have a wedge-like shape.

3. The rotation angle detecting apparatus according to claim 1, wherein said detection pattern has a circular pattern that is concentric with said angle detection pattern, and said arithmetic unit scans a projection image of said circular pattern in two directions orthogonal to each other and obtains said center of said angle detection pattern.

4. The rotation angle detecting apparatus according to claim 1, wherein said track is equally divided into an even number, an average of phases of frequency components of said respective line segments is obtained in each divided portion, and said center of said angle detection pattern is detected from a phase difference between said divided portions that face each other.

5. The rotation angle detecting apparatus according to claim 1, wherein said total circumferential scanning is carried out more than once with different radii.

6. The rotation angle detecting apparatus according to claim 2, wherein said total circumferential scanning is carried out more than once with different radii.

7. The rotation angle detecting apparatus according to claim 3, wherein said total circumferential scanning is carried out more than once with different radii.

8. The rotation angle detecting apparatus according to claim 4, wherein said total circumferential scanning is carried out more than once with different radii.

* * * * *